United States Patent [19]

Terazawa et al.

[11] Patent Number: 5,048,485
[45] Date of Patent: Sep. 17, 1991

[54] THROTTLE CONTROL METHOD FOR INTERNAL COMBUSTION ENGINE

[75] Inventors: Tadashi Terazawa, Toyota; Hiroshi Nakashima, Nishio; Yoshinori Taguchi, Nagoya, all of Japan

[73] Assignee: Aisin Seiki Kabushiki Kaisha, Kariya, Japan

[21] Appl. No.: 529,610

[22] Filed: May 29, 1990

[30] Foreign Application Priority Data

May 29, 1989 [JP] Japan .................................. 1-135256

[51] Int. Cl.$^5$ .......................... F02D 9/08; F02D 41/02
[52] U.S. Cl. ..................................... 123/399; 123/400
[58] Field of Search ......................... 123/361, 399, 400

[56] References Cited

U.S. PATENT DOCUMENTS

| | | | |
|---|---|---|---|
| 4,120,373 | 10/1978 | Fleischer | 123/399 X |
| 4,892,071 | 1/1990 | Asayama | 123/399 X |
| 4,898,138 | 2/1990 | Nishimura et al. | 123/399 |
| 4,919,097 | 4/1990 | Mitui et al. | 123/399 |
| 4,969,431 | 11/1991 | Wataya | 123/399 |

Primary Examiner—Willis R. Wolfe
Attorney, Agent, or Firm—Burns, Doane, Swecker & Mathis

[57] ABSTRACT

A throttle control method for an internal combustion engine wherein a motor is connected through a clutch mechanism to a throttle valve which is constantly biased toward a closed position by a return spring. The motor is controlled in accordance with an output signal from a throttle sensor which detects the degree of opening of the throttle valve. This arrangement controls the amount of intake air into the internal combustion engine. The clutch mechanism is engaged and disengaged in accordance with a running condition of the vehicle and an operating condition of the internal combustion engine. An operating condition of the motor, the throttle sensor, the clutch mechanism and the return spring, is detected by activating the motor and the clutch mechanism, and when an abnormality is detected in at least one of the devices, both the motor and the clutch mechanism are deactivated.

2 Claims, 10 Drawing Sheets a : Start
b : End
SP1: Engine at rest ?
SP2: Active motor and clutch mechanism
SP3: Motor and throttle sensor normal ?
SP4: Inactive motor and clutch mechanism
SP5: Clutch mechanism and return spring normal ?
SP6: Control throttle opening to lower level than in normal throttle control
SP7: Normal throttle control

Fig.1 a : Start
b : End
SP1: Engine at rest ?
SP2: Active motor and clutch mechanism
SP3: Motor and throttle sensor normal ?
SP4: Inactive motor and clutch mechanism
SP5: Clutch mechanism and return spring normal ?
SP6: Control throttle opening to lower level than in normal throttle control
SP7: Normal throttle control

Fig.6 a : Start
b : End
S1: Initialization
S2: Input processing
S3: Control mode ?
S4: Normal accelerator control
S5: Constant-speed running control
S6: Acceleration slip control
S7: Idling speed control
S8: Final processing
S9: Torque control
S10: Cornering control
S11: Final processing / Diagnosis control
S12: Output processing

Fig.7 a : Start
b : First system check
c : Second system check
301: Main relay ON / Starter relay OFF / Clutch mechanism OFF
302: RAM normal ?
303: RAM abnormality flag ← 1
304: No disconnection or short-circuit ?
305: Disconnection / short-circuit abnormality flag ← 1
306: System check starting conditions satisfied ?
310: Throttle valve at idling position ?
320: Clutch mechanism ON / Drive motor in valve opening direction through predetermined angle
321: Predetermined change in opening of throttle valve ?
322: Motor / throttle sensor abnormality flag ← 0

Fig.8 a : Third system check
b : Fourth system check
330: Supply holding current to motor /
    Clutch mechanism OFF
331: Throttle valve at initial position ?
332: Return spring abnormality flag ← 0 /
    Clutch mechanism abnormality flag ← 0
340: Suspend supply of holding current to motor
341: Throttle valve return to initial position
        within predetermined time T ?
342: Return spring abnormality flag ← 0 /
    Clutch mechanism abnormality flag ← 1

Fig.9 a : Fifth system check
b : Sixth system check
c : System check end
350: Drive motor in valve closing direction through predetermined angle
351: Throttle valve closed to predetermined opening position ?
352: Return spring abnormality flag ← 1 / Clutch mechanism abnormality flag ← 1
360: Clutch mechanism ON / Driving motor in valve closing direction through predetermined angle
361: System check 2nd time ?
362: System check flag ← 1
370: System abnormality flag ← 1
380: Main relay OFF / Clutch mechanism OFF / Motor OFF / Starter control relay ON

Fig. 10 a Throttle opening
b Accelerator opening
c In nomal situation
d In abnormal situation

Fig. 11

99
109
107 Timer circuit
108 Power circuit
100
$V_B$

Fig. 12 a From 306
b To 320
c To 310
d Accelerator pedal actuating quantity less than predetermined valve?

THROTTLE CONTROL METHOD FOR INTERNAL COMBUSTION ENGINE

BACKGROUND OF THE INVENTION

1. Field of the Invention

The present invention relates to a throttle control method for an internal combustion engine. More particularly, the present invention relates to a throttle control method wherein the degree of opening of the throttle valve is controlled by a motor, and the throttle valve and the motor are connected to each other and disconnected from each other by a clutch mechanism.

2. Description of the Related Art

The throttle valve of an internal combustion engine is arranged to control the output of the internal combustion engine by controlling either the fuel-air mixture in the case of a carburetor or the intake air quantity in the case of an electronically controlled fuel injector, in association with an accelerator actuating mechanism including an accelerator pedal connected to the throttle valve.

The accelerator actuating mechanism has heretofore been mechanically coupled to the throttle valve. There has recently been proposed an apparatus wherein the throttle valve is opened and closed in accordance with the operation of the accelerator by a driving means which is interlocked with a driving source, for example, a motor. For example, Japanese Patent Laid-Open Publication (KOKAI) No. 55-145867 (1980) discloses an apparatus wherein a stepping motor is coupled to the throttle valve and driven in accordance with the operation of the accelerator pedal. Japanese Patent Laid-Open Publication (KOKAI) No. 59-153945 (1984) discloses a similar apparatus.

It is, however, unclear in the above-described related art how to check as to whether or not each device, for example, a motor constituting the throttle control apparatus, is functioning normally. Generally, the motor and other constituent elements are individually checked, and when any of them is judged to be abnormal, the throttle control is suspended and the driver is informed that there is an abnormality in the throttle control apparatus. However, some functions of the constituent elements of the throttle control apparatus, for example, the operating function of a throttle sensor, cannot be checked when the motor and other associated devices are in an inoperative state. Accordingly, it is necessary in order to check the operating function of each device to detect an operating condition of the motor and other devices. To detect an operating condition of each device, the throttle valve must be opened and hence the rotational speed (RPM) of the internal combustion engine is undesirably raised, which makes the driver feel uncomfortable. There is also a fear that the vehicle speed will be uncontrollably increased.

SUMMARY OF THE INVENTION

It is an object of the present invention to provide a method for controlling a throttle for an internal combustion engine wherein the operating condition of each of the devices comprising a throttle control apparatus, for example, a motor, is detected and when any of the devices is abnormally functioning, a predetermined processing is executed.

It is another object of the present invention to provide a throttle control method which does not involve or permit an undesired rise in the rotational speed of the internal combustion engine during the detection of an operating condition of each device of the throttle control apparatus.

The present invention provides a throttle control method for an internal combustion engine wherein a motor is connected through a clutch mechanism to a throttle valve which is constantly biased toward a closed position by a return spring. The motor is controlled in accordance with an output signal from a throttle sensor which detects the degree of opening of the throttle valve, thereby controlling the amount of suction or intake air into the internal combustion engine. The clutch mechanism is engaged and disengaged in accordance with a running or operating condition of the vehicle and the operating condition of the internal combustion engine. The method comprising detecting an operating condition of each of the devices, that is, the motor, the throttle sensor, the clutch mechanism and the return spring by activating the motor and the clutch mechanism, and deactivating both the motor and the clutch mechanism when an abnormality is detected in at least one of the devices.

The throttle control method may be such that an operating condition of each of the devices, that is, the motor, the throttle sensor, the clutch mechanism and the return spring is detected by activating the motor and the clutch mechanism, and when an abnormality is detected in either the motor or the throttle sensor, both the motor and the clutch mechanism are deactivated, whereas, when the motor and the throttle sensor are detected to be normal and at least either the clutch mechanism or the return spring is abnormal, the throttle opening is controlled to a lower level than during normal throttle opening control.

Further, the above-described throttle control method may be such that the internal combustion engine is inhibited from being started and maintained in an inoperative state while the motor and the clutch mechanism are being activated in order to detect the operating condition of each of the devices, that is, the motor, the throttle sensor, the clutch mechanism and the return spring.

Figure 1:
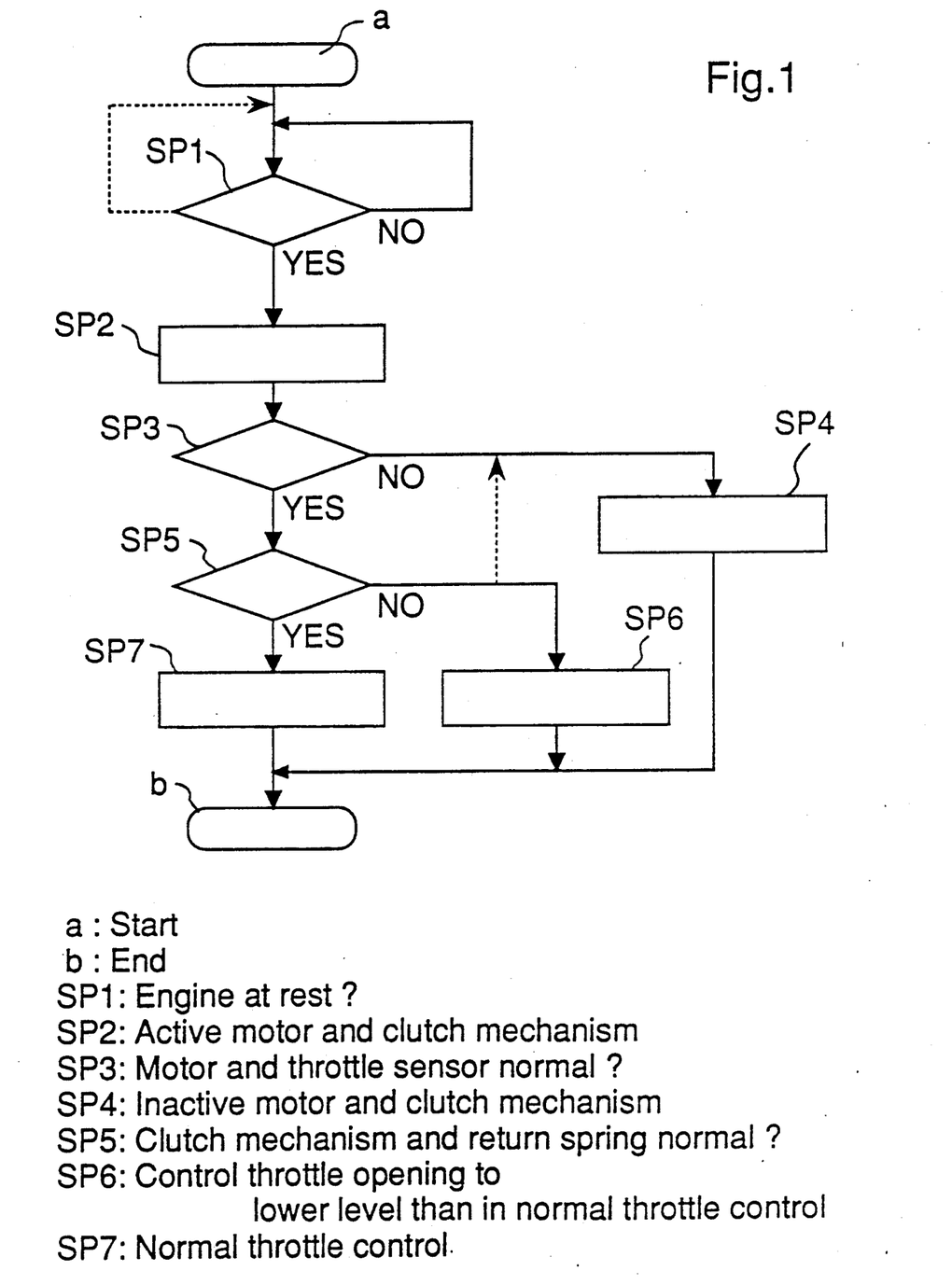
FIG. 1 is a flowchart showing a throttle control method for an internal combustion engine according to the present invention.

The above-described throttle control method is executed, for example, as shown in the flowchart of FIG. 1.

First, it is judged in Step SP1 whether or not the internal combustion engine is at rest. If YES, both the motor and the clutch mechanism are activated in Step SP2. As a result, the throttle valve is rotated against the return spring and the throttle sensor is activated. At this time, it is judged in Step SP3 whether, from the relationship between the output of the throttle sensor and the angle of rotation of the throttle valve, if the motor and throttle sensor operations are normal. If either the motor or the throttle sensor is judged to be abnormal, the process proceeds to Step SP4, in which both the motor and the clutch mechanism are deactivated. If both the motor and the throttle sensor are judged to be normal in Step SP3, the process proceeds to Step SP5, in which it is judged whether or not both the clutch mechanism and the return spring are normal by, for example, judging whether or not the throttle valve returns to its initial position when the clutch mechanism is deactivated with the motor being supplied with a predetermined holding current. If either the clutch mechanism or the return spring is judged to be abnormal, the throttle opening is controlled to a lower level than during normal throttle opening control in Step SP6, whereas, if both are judged to be normal, the process proceeds to Step SP7, in which normal throttle control is executed.

The above-described throttle control process may proceed as shown by the chain lines, with Steps SP1 and SP6 being omitted, or Step SP1 alone may be omitted.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DETAILED DESCRIPTION OF THE PREFERRED EMBODIMENTS

Preferred embodiments of the throttle control method according to the present invention will be described below with reference to the accompanying drawings.

Figure 2:
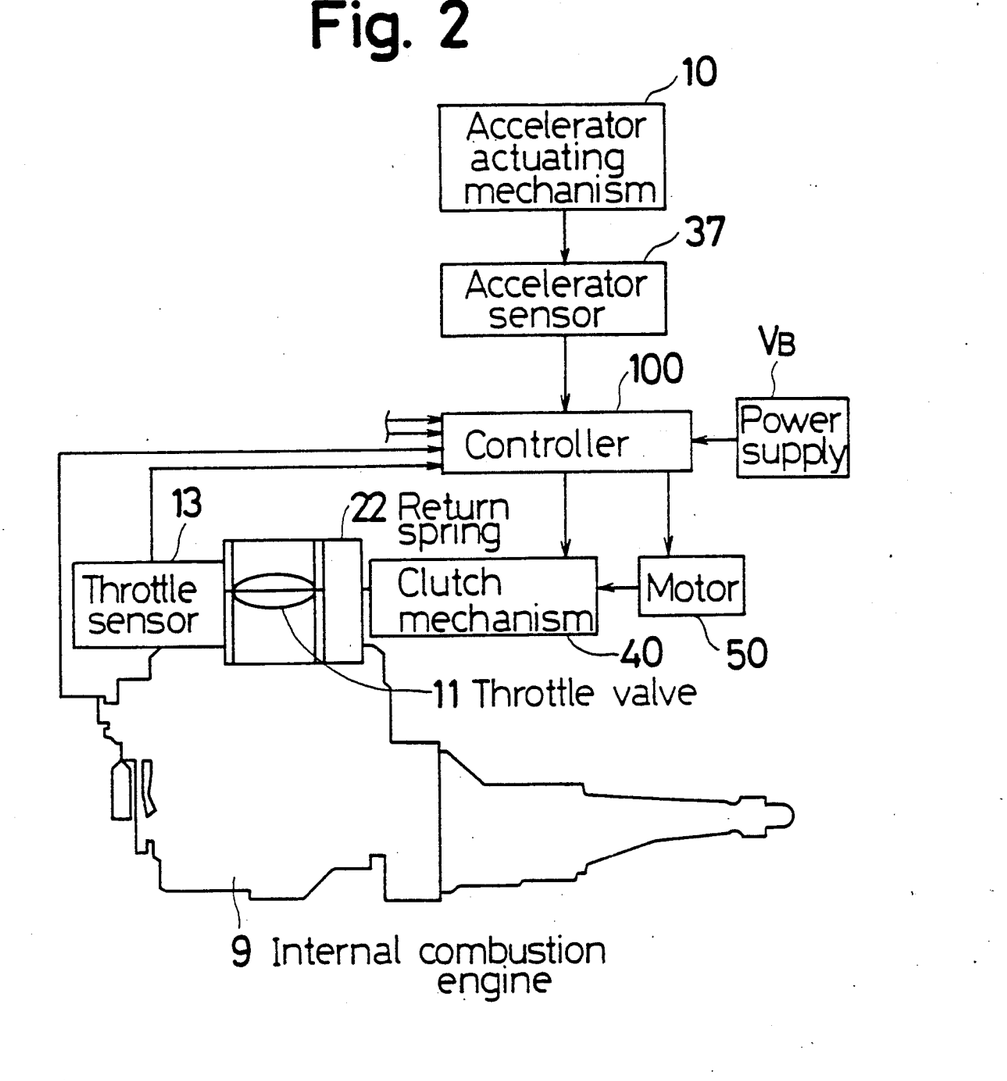
FIG. 2 is a block diagram showing the basic arrangement of a throttle control apparatus which may be employed to carry out one embodiment of the throttle control method according to the present invention.

Referring first to FIG. 2, which shows the basic arrangement of an apparatus which may be employed to carry out one embodiment of the throttle control method according to the present invention, a throttle valve 11 is attached to an internal combustion engine 9 and constantly biased in a closed direction by a return spring 22. A motor 50 is connected to the throttle valve 11 through an electromagnetic clutch mechanism 40. The throttle valve 11 is provided with a throttle sensor 13. An output signal from the throttle sensor 13 is inputted to a controller 100, together with signals which include a signal representative of the operating condition of the internal combustion engine 9. Similarly, an output signal from an accelerator sensor 37 which is provided in an accelerator actuating mechanism 10 is inputted to the controller 100. The controller 100 is connected to a power supply VB. Thus, the electromagnetic clutch mechanism 40 and the motor 50 are operated under the control of the controller 100.

A specific arrangement of the above-described throttle control apparatus will be explained below in detail with reference to FIGS. 3 and 4. The throttle valve 11 is rotatably supported by a throttle shaft 12 inside an intake passage in a throttle body 1 of an internal combustion engine. A casing or housing 2 is formed as an integral part of the side of the throttle body 1 where one end of the throttle shaft 12 is supported, and a cover 3 is connected to the casing 2. The throttle sensor 13 is attached to the side of the throttle body 1 that is remote from the casing 2 and where the other end of the throttle shaft 12 is supported.

The throttle sensor 13, which has a detector for detecting the degree of opening of the throttle valve 11, is connected to the throttle shaft 12 to detect an angular displacement of the throttle shaft 12 and convert it into an electric signal. For example, an idling switching signal and a throttle opening signal are outputted to the controller 100.

A movable yoke 43 is rigidly secured to the other end of the throttle shaft 12 so that the throttle valve 11 rotates together with the movable yoke 43 as one unit. As will be clear from FIG. 4, the movable yoke 43 is a circular dish-like magnetic member having a shaft portion that is rigidly secured to the throttle shaft 12. The movable yoke 43 is fitted to a fixed yoke 44, which is a magnetic member having substantially the same configuration as that of the movable yoke 43, with a predetermined air gap provided therebetween in such a condition that respective opening ends of the yokes face each other and the respective side walls and shaft portions are axially superposed one upon another. The fixed yoke 44 is rigidly secured to the throttle body 1. A coil 45, wound around a bobbin 46 which is made of a nonmagnetic material, is accommodated in a space that is defined between the shaft portion and side wall of the fixed yoke 44. A friction member 43a which is made of a nonmagnetic material is buried or positioned in a bottom wall of the movable yoke 43 such that the friction member 43a is disposed around the throttle shaft 12. A driving plate 41 is disposed so as to face the friction member 43a across a clutch plate 42 which is a disc-shaped magnetic member. Thus, the foregoing members comprise the electromagnetic clutch mechanism 40.

The driving plate 41 is a circular dish-like member having a shaft portion in the center thereof, the shaft portion being supported on the throttle shaft 12 in such a manner as to be rotatable around it. The driving plate 41 has an external gear which is formed integral with the shaft portion thereof such that the external gear meshes with external teeth which are formed on the small-diameter portion of a gear 52 described later. The clutch plate 42 is coupled to the bottom surface of the driving plate 41 through a leaf spring 41a, as shown in FIG. 4. The clutch plate 42 is biased toward the driving plate 41 by the action of the leaf spring 41a, so that the clutch plate 42 is kept separate from the movable yoke 43 when the coil 45 is not energized.

The gear 52 that is meshed with the driving plate 41 is a stepped columnar member having a small-diameter portion and a large-diameter portion which have respective external teeth, the gear 52 being supported by a shaft 52a which is rigidly secured to the cover 3 such that the gear 52 is rotatable around the shaft 52a. The motor 50 is secured to the cover 3 such that a rotary shaft of the motor 50 extends parallel to the shaft 52a and is rotatably supported by a bearing arrangement. A gear 51 is rigidly secured to the distal end of the rotary shaft of the motor 50, the gear 51 being meshed with the external teeth formed on the large-diameter portion of the gear 52. In this embodiment, a stepping motor is used as the motor 50 and the drive of the stepping motor is controlled by the controller 100.

Thus, when the motor 50 is driven to rotate the gear 51, the gear 52 rotates, and the driving plate 41 that is meshed with the gear 52 rotates around the throttle shaft 12, together with the clutch plate 42. If the coil 45, shown in FIG. 4, is not energized at this time, the clutch plate 42 is kept separate from the movable yoke 43 by means of the biasing force from the leaf spring 41a. More specifically, in such a case, the movable yoke 43, the throttle shaft 12 and the throttle valve 11 are free to rotate independently of the driving plate 41. When the movable yoke 43 and the fixed yoke 44 are excited, the clutch plate 42 is attracted toward the movable yoke 43 by means of electromagnetic force against the biasing force from the leaf spring 41a and eventually brought into contact with the movable yoke 43. Thus, the clutch plate 42 and the movable yoke 43 are brought into frictional engagement with each other. This frictional engagement and the action of the friction member 43a together enable the clutch plate 42 and the movable yoke 43 to rotate together in the connected state. More specifically, in this case the driving plate 41, the clutch plate 42, the movable yoke 43, the throttle shaft 12 and the throttle valve 11 are driven to rotate together as one unit by the motor 50 through the gears 51 and 52.

An accelerator shaft 32 is rotatably supported by the cover 3 in parallel to the throttle shaft 12, the outer end portion of the accelerator shaft 32 projecting from the cover 3. A rotary lever accelerator link 31 is secured to a projecting end portion of the accelerator shaft 32. A pin 33a which is rigidly secured to one end of an accelerator cable 33 is engaged with the distal end of the accelerator link 31. The accelerator link 31 has a return spring 35 coupled thereto to bias both the accelerator link 31 and the accelerator shaft 32 in a direction corresponding to the direction in which the throttle valve 11 is closed. The other end of the accelerator cable 33 is coupled to an accelerator pedal 34, thus constituting the accelerator actuating mechanism 10, in which both the accelerator link 31 and the accelerator shaft 32 rotate about the axis of the accelerator shaft 32 in response to the operation of the accelerator pedal 34.

An accelerator plate 36 is rigidly secured to the accelerator shaft 32 at the portion thereof that extends between the throttle body 1 and the cover 3, that is, inside the casing 2. A throttle plate 21 is secured to a small diameter portion 24 of the accelerator shaft 32 in opposing relation to the accelerator plate 36.

The throttle plate 21 is supported at the central portion thereof by the small-diameter portion 24 of the accelerator shaft 32 and comprises two portions which have a relatively small radius and a relatively large radius, respectively, and which are circumferentially contiguous with each other. As shown in FIG. 3, external teeth are formed on the outer surface of the large-radius portion of the throttle plate 21. The external teeth of the throttle plate 21 are meshed with the external teeth formed on the aforementioned movable yoke 43, so that the throttle plate 21 rotates in response to the rotation of the movable yoke 43, or the movable yoke 43 rotates in response to the rotation of the throttle plate 21, thus enabling unitary rotation of the throttle shaft 12 and the throttle valve 11 that are connected thereto.

In addition, the throttle plate 21 has a step which is formed at the joint of the small and large-radius portions, thus defining an end cam by the outer peripheral surface of the throttle plate 21. A pin 23 is secured to the large-radius portion of the throttle plate 21. One end of the return spring 22 is retained by the shaft portion of the throttle plate 21, and the other end of the return spring 22 is retained by a pin which projects from the casing 2. Accordingly, the throttle plate 21 is constantly biased by the force from the return spring 22 in the direction of the arrow B shown in FIG. 3, that is, in the direction in which the throttle valve 11 is closed.

The accelerator plate 36 comprises a disc portion which is rigidly secured at the center thereof to the accelerator shaft 32 and an arm portion which radially extends from the disc portion. That portion of the disc portion which is contiguous with the arm portion has a relatively short radius to define a recess, thus defining an end cam by the outer peripheral surface of the disc portion. The arm portion is disposed such that one side surface that extends in the radial direction of the disc portion faces the pin 23 that is secured to the throttle plate 21. Thus, when the accelerator plate 36 rotates in the direction of the arrow A in FIG. 3, eventually the arm portion abuts against the pin 23 on the throttle plate 21 and the accelerator plate 36 and the throttle plate 21 rotate together as one unit. It should be noted that the accelerator plate 36 has a pin 36c which projects therefrom in the axial direction of the accelerator shaft 32. Thus, the accelerator plate 36 and the throttle plate 21 shown in FIG. 3 are in their initial positions. When the driving plate 41 is connected to the movable yoke 43 by the electromagnetic clutch mechanism 40, the throttle valve 11 is driven to rotate by the motor 50.

An accelerator sensor 37 is fitted on the outer periphery of an accelerator shaft bearing portion formed on the cover 3. The accelerator sensor 37 has a known structure which comprises a member formed with a thick film resistor and a brush which faces the resistor. The accelerator sensor 37 is disposed so that the brush is engaged with the pin 36c provided on the accelerator plate 36. Thus, the angle of rotation of the accelerator shaft 32 that rotates together with the accelerator plate 36 as one unit is detected by the accelerator sensor 37. The accelerator sensor 37 is electrically connected to a printed wiring board 70 which is interposed between the casing 2 and the cover 3. The printed wiring board 70 is electrically connected to the controller 100 through lead wires 71.

Figure 4:
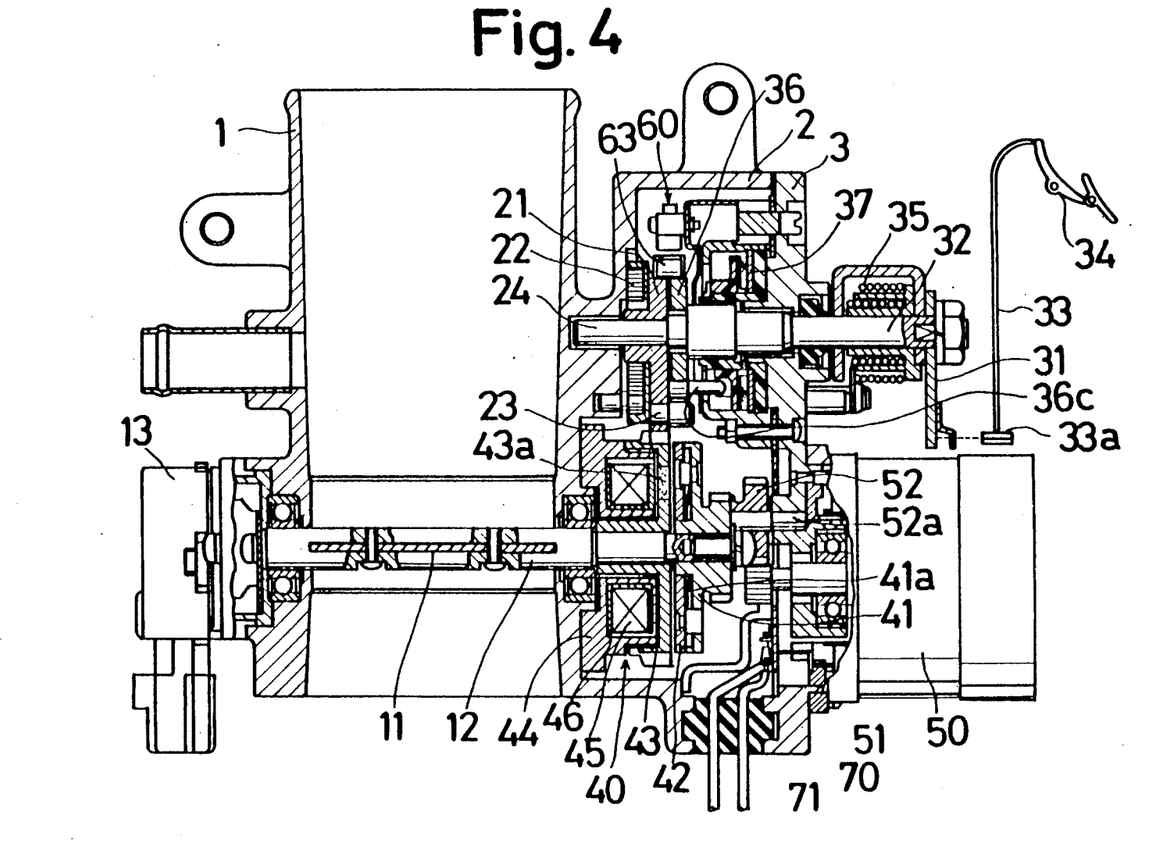
FIG. 4 is a longitudinal sectional view of the throttle control apparatus.

A limit switch 60 which operates in association with the throttle plate 21 and the accelerator plate 36 is secured to the casing 3 through a stay or support member, as shown in FIG. 4, and electrically connected to the printed wiring board 70. The limit switch 60 has opposing contacts (not shown) and a roller 63 which is attached to the distal end portion of the limit switch 60.

Figure 3:
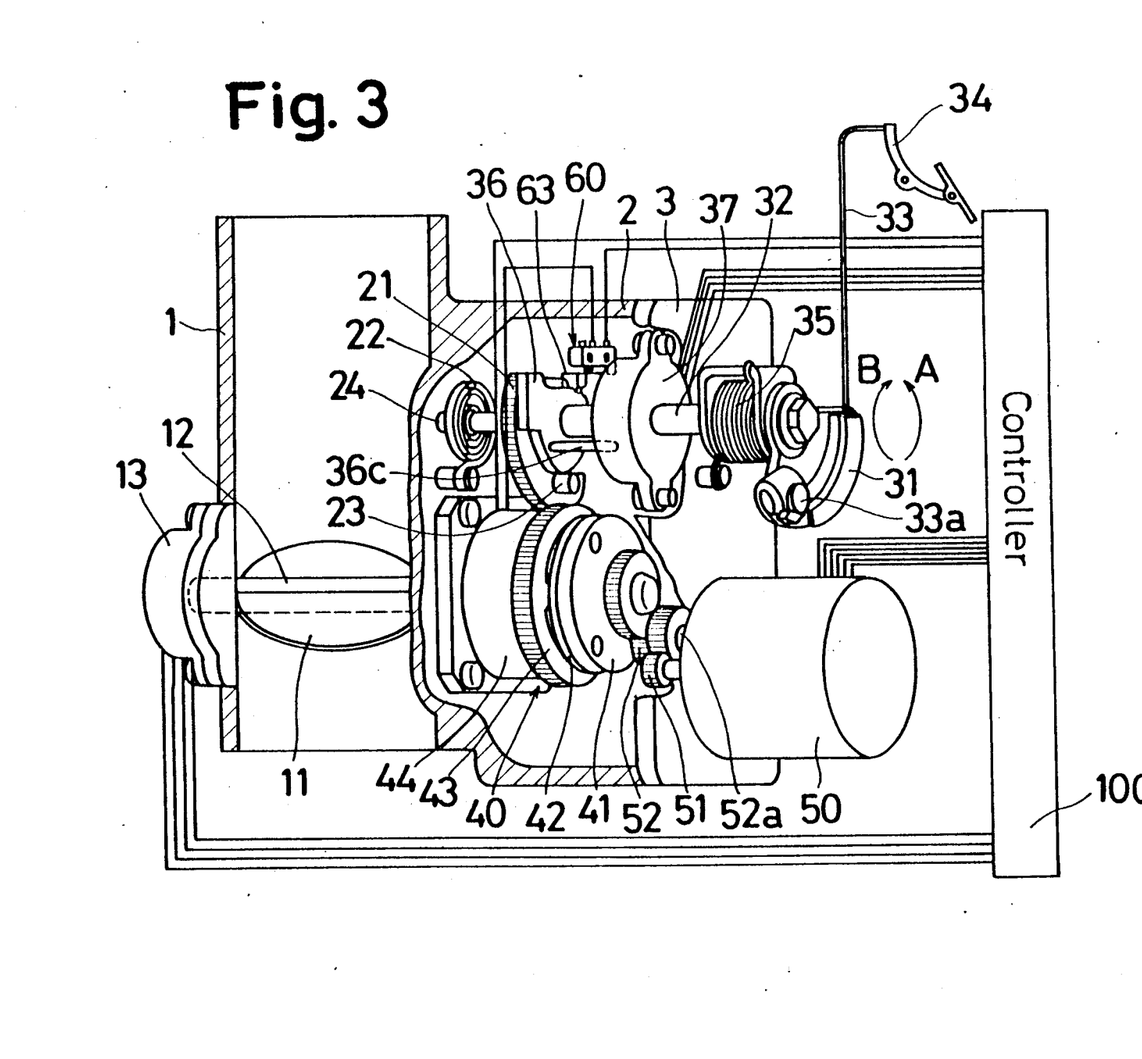
FIG. 3 is an exploded perspective view of the throttle control apparatus shown in FIG. 2.

The roller 63 is constantly biased so as to abut on the outer peripheral surfaces of the throttle plate 21 and the accelerator plate 36, as will be clear from FIGS. 3 and 4. Accordingly, the roller 63 moves in accordance with the profiles of the end cams respectively formed on the throttle plate 21 and the accelerator plate 36, so that the opposing contacts come in and out of contact with each other in response to the cam following action of the roller 63. The opposing contacts of the limit switch 60 are in contact with each other except when the accelerator pedal 34 is stepped on or depressed less than a predetermined accelerator actuating quantity, that is, the angle of rotation of the accelerator plate 36 is less than a predetermined angle, and the throttle plate 21 is driven to rotate in excess of a predetermined angle.

Thus, when the accelerator pedal 34 is stepped on less than a predetermined accelerator actuating quantity, for example, when the accelerator plate 36 is in the state that is shown in FIG. 3, i.e., the accelerator actuating quantity is approximately zero, and the throttle valve 11 is opened in excess of a predetermined angle, that is, the throttle plate 21 rotates in the direction of the arrow A in FIG. 3 in excess of a predetermined angle, the roller 63 abuts on the respective small-radius portions of the throttle and accelerator plates 21 and 36 and consequently the opposing contacts are separated from each other.

Figure 5:
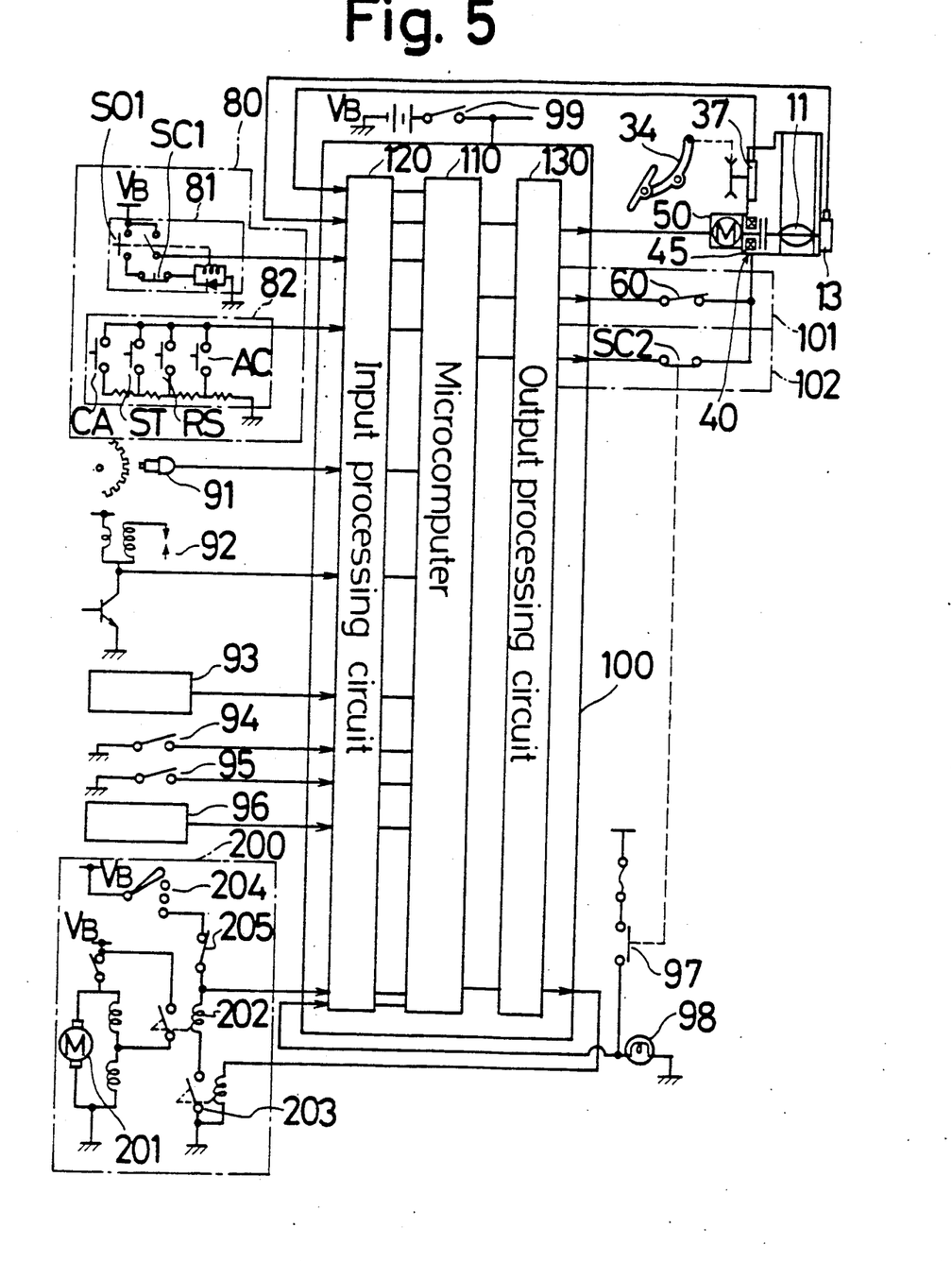
FIG. 5 shows the general arrangement of the controller and input/output devices of the throttle control apparatus.

The controller 100, which is a control circuit including a microcomputer, is mounted on the vehicle and supplied, as input signals, with detecting signals from various sensors, as shown in FIG. 5, thereby effecting various control operations including the drive control of the electromagnetic clutch mechanism 40 and the motor 50. In this embodiment, the controller 100 effects various control operations such as constant-speed running control, acceleration slip control, etc. in addition to the control usually effected in response to the operation of the accelerator pedal 34.

Referring next to FIG. 5, the controller 100 has a microcomputer 110 and input and output processing circuits 120 and 130, which are connected to the microcomputer 110. The motor 50 is connected to the output processing circuit 130. The coil 45 of the electromagnetic clutch mechanism 40 is connected to the output processing circuit 130 through first and second energizing circuits 101 and 102. The controller 100 is connected to the power supply VB through an ignition switch 99. In addition, a main relay (not shown) is provided as a means for opening and closing the respective power circuits of the coil 45 and the motor 50. The main relay 109 supplies electric power to these power circuits when the ignition switch 99 is turned on. The main relay 109 may be replaced with another kind of switching element, for example, a transistor. It should be noted that the controller 100 has a backup power supply (not shown) to store an operating condition of each constituent element of the throttle control apparatus that is detected in a system check processing (described later).

The accelerator sensor 37 is connected to the input processing circuit 120 to output a signal corresponding to the accelerator actuating quantity, that is, the amount to which the accelerator pedal 34 is stepped on or depressed. Thus, the output signal from the accelerator sensor 37 is inputted to the input processing circuit 120, together with the output signal from the throttle sensor 13. The controller 100 controls the electromagnetic clutch mechanism 40 in accordance with operating conditions, thereby controlling the drive of the motor 50 so as to obtain a degree of opening of the throttle valve 11, i.e., a throttle opening, which is set in accordance with the amount to which the accelerator pedal 34 is stepped on, i.e., accelerator opening, together with the operating condition of the internal combustion engine and the running condition of the vehicle.

A switch 80 for constant-speed running control (hereinafter referred to simply as "constant-speed running switch 80) is connected to the input processing circuit 120. The constant-speed running switch 80 comprises a main switch 81 which is actuated to turn on/off the power supply for the whole constant-speed running control system, and a control switch 82 which is used to effect various control operations. The control switch 82 comprises a plurality of switches, as shown in FIG. 5, thus providing known various switching functions. In the figure, reference symbol AC denotes an accelerator switch, ST a set switch, CA a cancel switch, and RS a resume switch.

A wheel speed sensor 91 is used for constant-speed running control, acceleration slip control, etc. As the wheel speed sensor 91, a known electromagnetic pickup sensor, e.g., a Hall sensor may be employed. Although one wheel speed sensor 91 is shown in FIG. 5, a plurality of sensors 91 may be attached to all the wheels, respectively, if necessary. Further, an ignition circuit unit 92, which is commonly known as an ignitor, is connected to the controller 100 to input thereto the ignition signal, thereby detecting the number of revolutions (RPM) of the internal combustion engine.

A transmission controller 93, which is an electronic controller that controls an automatic transmission, detects an operating condition of the internal combustion engine and a running condition of the vehicle from signals which are inputted thereto from the wheel speed sensor 91, the throttle sensor 13, etc., computes a gear position and other necessary data on the basis of these input signals by means of a microcomputer, and outputs a gear-changing signal and a timing signal, thereby driving a solenoid valve to control the level of hydraulic pressure which is supplied to a brake or a clutch, and thus effecting a gear-changing operation. Thus, a gear-changing signal and timing signal which are outputted from the transmission controller 93 are supplied to the controller 100.

A mode changeover switch 94 is used to set a degree of opening of the throttle valve 11 which corresponds to each particular driving mode by properly selecting one of the operating maps which have been stored in the microcomputer 110 in correspondence to various driving modes, in regard to the relationship between the amount to which the accelerator pedal 34 is stepped on and the degree of opening of the throttle valve 11. Examples of driving modes which may be set are power driving mode, economy driving mode, highway driving mode, city driving mode, etc. An acceleration slip control inhibit switch 95 is actuated, when the driver does not want acceleration slip control, to output an acceleration slip control inhibit signal to the microcomputer 110. A steering sensor 96 judges, for example, when the acceleration slip control is effected, whether or not the steering wheel has been turned, and enables a target slip factor to be set in accordance with the result of the judgement. A brake switch 97 opens and closes in response to the operation of the brake pedal (not shown). When the brake switch 97 turns on, a brake lamp 98 turns on and, at the same time, a normally-closed switch SC2 is opened to disconnect the second energizing circuit 102 for constant-speed running control, which is connected to the electromagnetic clutch mechanism 40.

A starter circuit 200, which controls the drive of a starter motor 201, has a relay 202 which opens and closes a drive circuit for the starter motor 201 under control, and a starter control relay 203 is provided in series to a coil that constitutes the relay 202. The starter control relay 203 is controlled in response to an output signal from the controller 100. A starter switch 204 is connected in series to the relay 202 and the starter control relay 203. In a vehicle which is equipped with an automatic transmission, a neutral start switch 205 is interposed between the relay 202 and the starter switch 204. When the automatic transmission (not shown) is in a neutral position, the neutral start switch 205 is in an on-state, and if, in this state, the starter switch 204 is turned on, the coil of the relay 202 is energized as long as the starter control relay 203 is in an on-state with the conditions described below being satisfied. As a result, the drive circuit for the starter motor 201 turns on to activate the starter motor 201.

Thus, at the time of starting the engine, even if the starter switch 204 is turned on, the starter control relay 203 is in an off-state and the starter motor 201 is in an inoperative state, as described later. It should be noted that the microcomputer 110 has a CPU, ROM, RAM, etc., which are connected to input/output ports through buses, as is well known, but these elements are not shown in FIG. 5.

Figure 6:
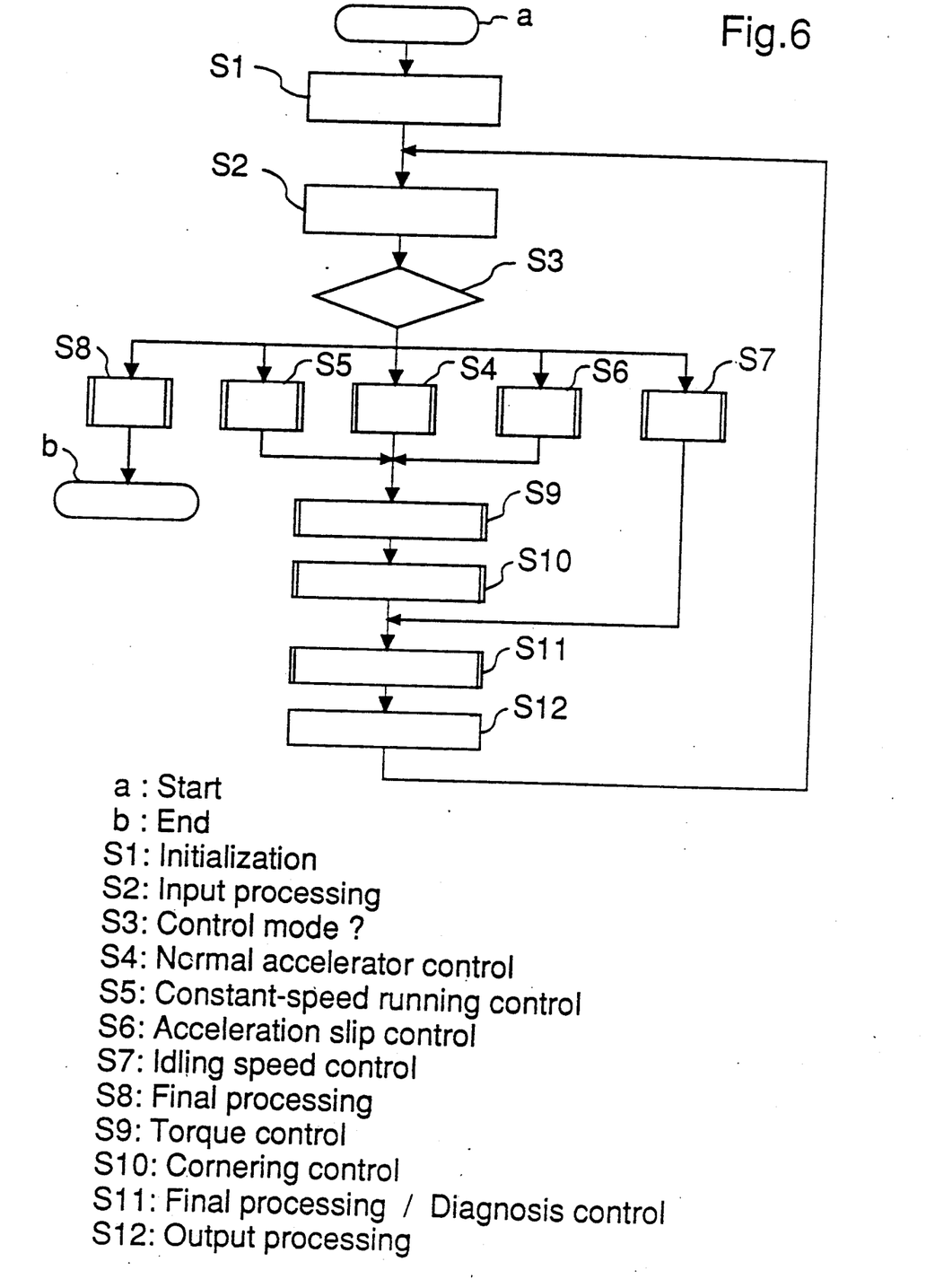
FIG. 6 is a flowchart showing the overall performance of the throttle control apparatus shown in FIGS. 2 to 5.

FIG. 6 is a flowchart showing the overall performance of the throttle control apparatus shown in FIGS. 2 to 5. In the controller 100, initialization is executed in Step S1, and the above-described various input signals which are inputted to the input processing circuit 120 are processed in Step S2. The process then proceeds to Step S3, in which a control mode is selected in accordance with these input signals. More specifically, any one of Steps S4 to S8 is selected.

When the control process of any one of Steps S4 to S6 has been executed, torque control and cornering control are executed in Steps S9 and S10. In the torque control, throttle control is effected in such a manner as to reduce the shock that acts on the vehicle during a gear-changing operation. In the cornering control, throttle control is effected in accordance with the angle of rotation of the steering wheel (not shown). The idling speed control in Step S7 is to maintain the idling speed at a constant value even if the engine condition changes. The final processing in Step S8 is to execute a post-processing after the ignition switch 99 is turned off. In Step S11, a self-diagnosis is made by a diagnosis means to carry out a fail processing, and in Step S12 an output processing is executed to drive the electromagnetic clutch mechanism 40 and the motor 50 through the output processing circuit 130. In this way, the above-described routine is repeated in a predetermined cycle.

In the above-described overall performance of the throttle control apparatus, the normal accelerator control operation that is executed in Step S4 will first be explained. When the accelerator pedal 34 is not actuated, that is, when the throttle valve 11 is fully closed, the throttle plate 21 and the accelerator plate 36 are disposed as shown in FIG. 3, and the limit switch 60 is in an onstate, so that the coil 45 of the electromagnetic clutch mechanism 40 is energized through the first energizing circuit 101.

When the coil 45 is energized to excite the fixed and movable yokes 44 and 43, the clutch plate 42 is connected to the movable yoke 43, resulting in a state wherein the driving force from the motor 50 is transmitted to the throttle shaft 12. Thereafter, the throttle shaft 12 is driven to rotate by the motor 50 unless an abnormal situation occurs. Accordingly, the degree of opening of the throttle valve 11 is controlled by the control of the motor 50 that is effected in the controller 100.

More specifically, during the normal accelerator control, when the accelerator pedal 34 is stepped on, the accelerator link 31 is rotated in accordance with the accelerator pedal actuating quantity against the biasing force from the return spring 35. In consequence, the accelerator plate 36 rotates in the direction of the arrow A shown in FIG. 3, thus maintaining the limit switch 60 in the onstate. In addition, the angle of rotation of the accelerator plate 36 that corresponds to the accelerator pedal actuating quantity is detected by the accelerator sensor 37 associated with the accelerator plate 36 through the pin 36c shown in FIG. 3.

The detecting output from the accelerator sensor 37 is inputted to the controller 100, in which a predetermined target throttle opening corresponding to the angle of rotation of the accelerator plate 36 is obtained. When the motor 50 is driven to rotate the throttle shaft 12, a signal corresponding to the angle of rotation of the throttle shaft 12 is outputted from the throttle sensor 13 to the controller 100, and the drive of the motor 50 is controlled by the controller 100 so that the opening of the throttle valve 11 becomes approximately equal to the target throttle opening. Thus, throttle control is effected in accordance with the accelerator pedal actuating quantity to obtain an engine output corresponding to the degree of opening of the throttle valve 11.

It should be noted that, during the above-described operation of the throttle valve 11, the accelerator plate 36 and the throttle plate 21 are not engaged with each other and the accelerator plate 36 follows the rotation of the throttle plate 21 with a predetermined angle maintained therebetween. Accordingly, there is no mechanical interlocking relation occurring between the accelerator pedal 34 and the throttle valve 11 and it is possible to ensure smooth start and running in response to the operation of the accelerator pedal 34. When the accelerator pedal 34 is released, the accelerator link 31 is returned to the initial position by means of the biasing force from the return spring 35 and the throttle valve 11 is also brought to the full-closed position.

When the throttle valve 11 operates abnormally during the above-described normal accelerator control, if the accelerator pedal 34 is released from the operative state, the accelerator plate 36 is returned to the initial position by the action of the return spring 35. As a result, the limit switch 60 turns off to disconnect the first energizing circuit 101. Since the second energizing circuit 102 for constant-speed running control is in an open state, the coil 45 is no longer energized, so that the movable yoke 43 of the electromagnetic clutch mechanism 40 is separated from the clutch plate 42. Accordingly, the drive of the throttle valve 11 by the driving plate 41 is suspended, and the throttle valve 11 is returned to the initial position by the action of the return spring 22.

In the constant-speed running control in Step S5, when the set switch ST in the control switch 82 is actuated after the normally-open switch SO1 in the main switch 81, shown in FIG. 5, has been actuated, the coil 45 is supplied with a current through the normally-closed switch SC2 and thus excited. In this case, if the accelerator pedal 34 is released when the degree of opening of the throttle valve 11 is greater than a predetermined throttle opening, the limit switch 60 is brought into an off-state to open the first energizing circuit 101. However, during the constant-speed running control, the coil 45 is continuously energized through the second energizing circuit 102 and the throttle shaft 12 is therefore connected to the motor 50 through the electromagnetic clutch mechanism 40. Thus, a target throttle opening is set in accordance with the difference between a vehicle speed that is detected by the wheel speed sensor 91 and a vehicle speed that is set through the set switch ST, and the throttle valve 11 is controlled to the target throttle opening by the operation of the motor 50.

In the acceleration slip control in Step S6 that is shown in FIG. 6, if a slip of a driving wheel (not shown) is detected at the time of starting or accelerating the vehicle in the controller 100 on the basis of the output signal from the wheel speed sensor 91 shown in FIG. 5, the acceleration slip control mode is selected to control the degree of opening of the throttle valve 11. More specifically, the controller 100 computes a slip factor of the driving wheel with which adequate tractive force and resistance to side slip are obtained on the particular road surface and further computes a target throttle opening required to ensure the computed slip factor. Then, the motor 50 is controlled so that the degree of opening of the throttle valve 11 is coincident with the target throttle opening. When the slip factor becomes lower than a predetermined value and the target throttle opening becomes higher than a set throttle opening in the normal accelerator control mode, the acceleration slip control mode is completed and the control mode returns to the normal accelerator control.

Figure 7:
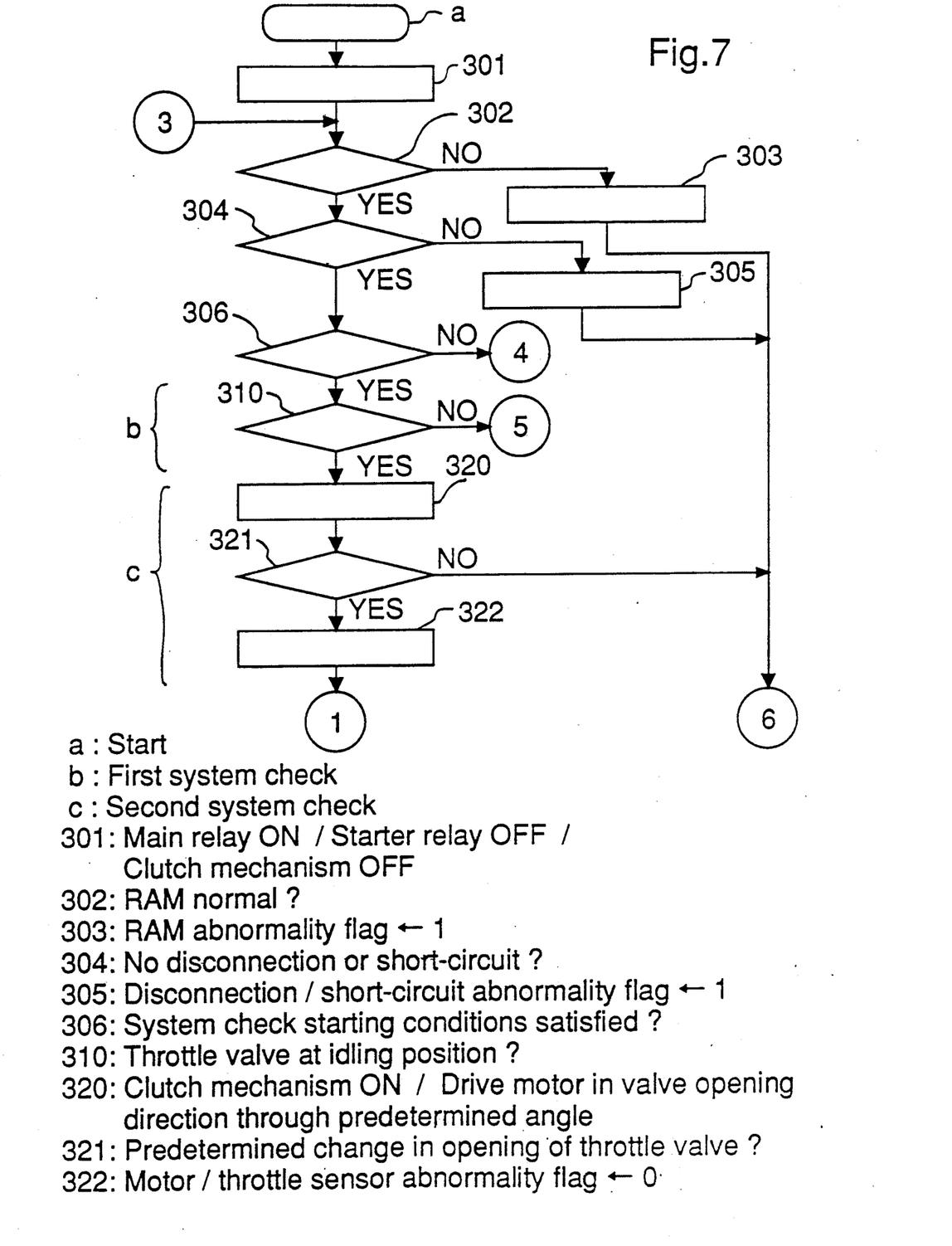
FIGS. 7, 8 and 9 are flowcharts showing the processing routine of system checks for the throttle control apparatus.
Figure 8:
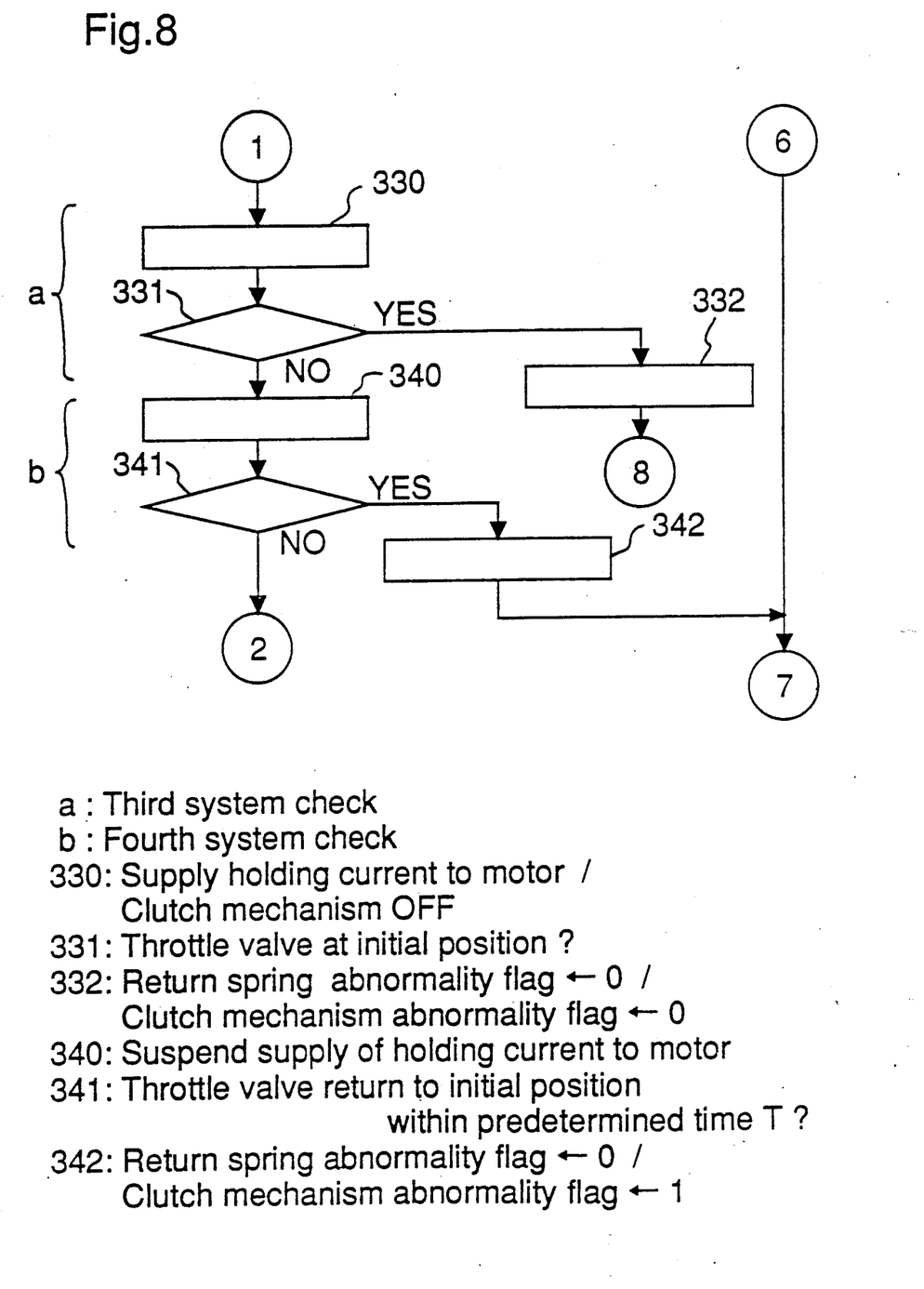
Figure 9:
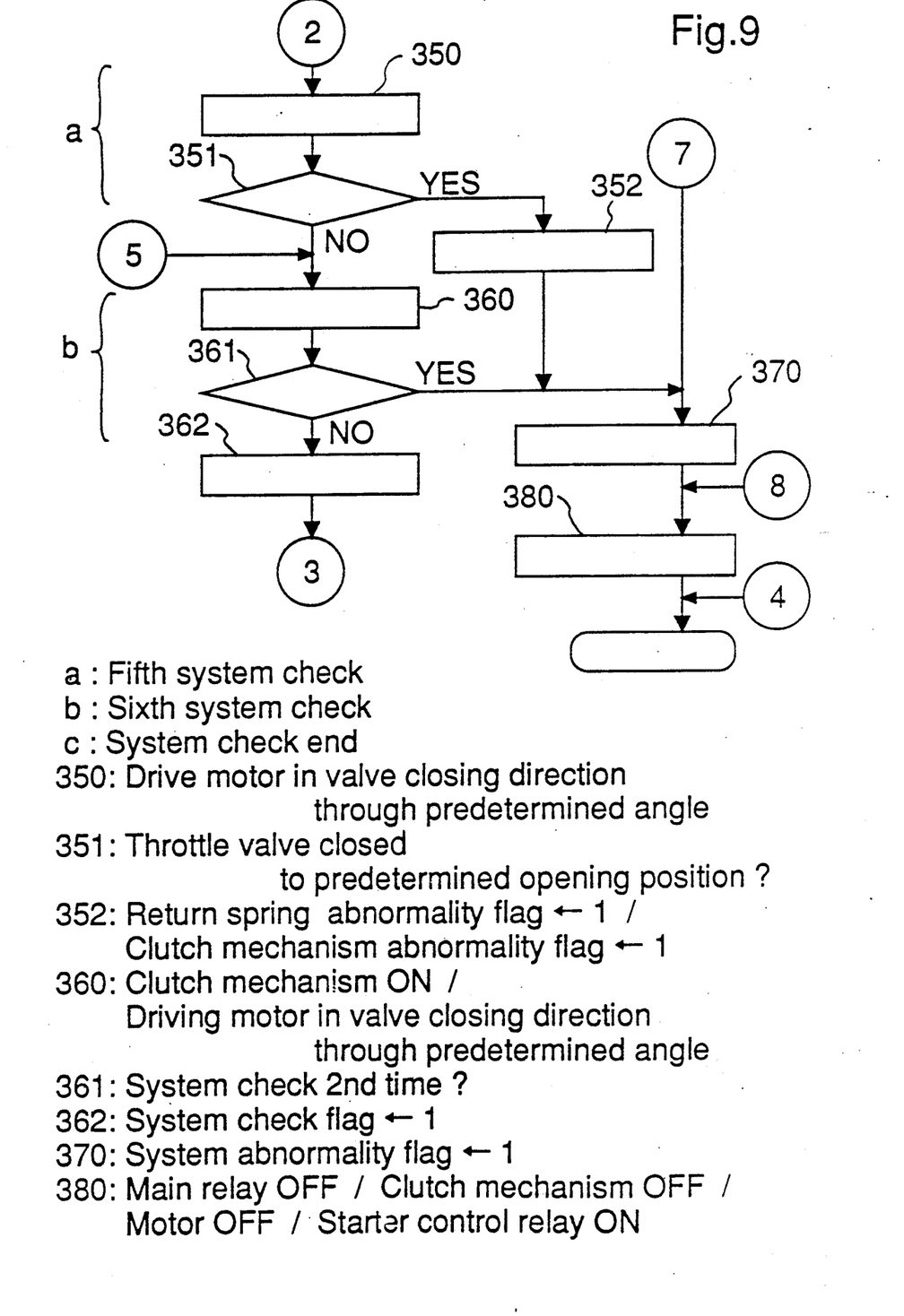

The processing routine of system checks on the performances of the constituent elements of the throttle control apparatus, for example, the motor 50, which is executed immediately before or after Step S1 in regard to the flowchart shown in FIG. 6, will next be explained in detail with reference to FIGS. 7 to 9.

In Step 301, when the ignition switch 99 that is shown in FIG. 5 is turned on, the controller 100 is started, and the main relay 109 is turned on, while the starter control relay 203 in the starter circuit 200 is turned off. Thus, the drive circuit for the starter motor 201 is maintained in an off-state until the starter control relay 203 is turned on. In addition, the electromagnetic clutch mechanism 40 is turned off. Thus, the motor 50 and the throttle valve 11 are set in a disconnected state.

Next, Step 302 checks whether or not the RAM in the microcomputer 110 is normal If the RAM is judged to be abnormal, an abnormality flag which indicates that the RAM is abnormal is set to "1" in Step 303, and the process then proceeds to Step 370, in which a system abnormality flag is set to "1". If the RAM is judged to be normal in Step 302, it is then checked in Step 304 whether or not there is disconnection or short-circuit in the wires or elements for interconnection between the various switches shown in FIG. 5 and the controller 100. If disconnection or short-circuit is found, an abnormality flag which indicates disconnection or short-circuit is set to "1" in Step 305, and the process then proceeds to Step 370. Since the check on the RAM and the check on disconnection are well known, description thereof is omitted.

When none of these abnormalities are found, the process proceeds to Step 306, in which system check starting conditions are judged. More specifically, the following system checks are made only when the vehicle speed is zero and the number of revolutions of the internal combustion engine (RPM) is zero, and the normal control is effected as it is except when these conditions are satisfied. It should be noted that a overrride or "limp home" mechanism may be added to the throttle control apparatus in accordance with this embodiment so that it is possible to move the vehicle even when the motor 50, the controller 100 or other constituent element breaks down. The limp home mechanism enables the throttle valve 11 to be mechanically opened a little by stepping on the accelerator pedal 34 to a substantial degree. Addition of the limp home mechanism enables the vehicle to run at low speed and arrive at a repair shop even when the motor 50, the controller 100 or other constituent element breaks down.

With such an advanced throttle control apparatus, even when the system check starting conditions are judged to be satisfied in Step 306, if the accelerator pedal 34 is stepped on to a substantial degree, the throttle valve 11 is undesirably opened. In other words, in the case of a such a throttle control apparatus, even when the system check starting conditions are judged to be satisfied in Step 306, the throttle valve 11 is not always in the full-closed position.

Figure 12:
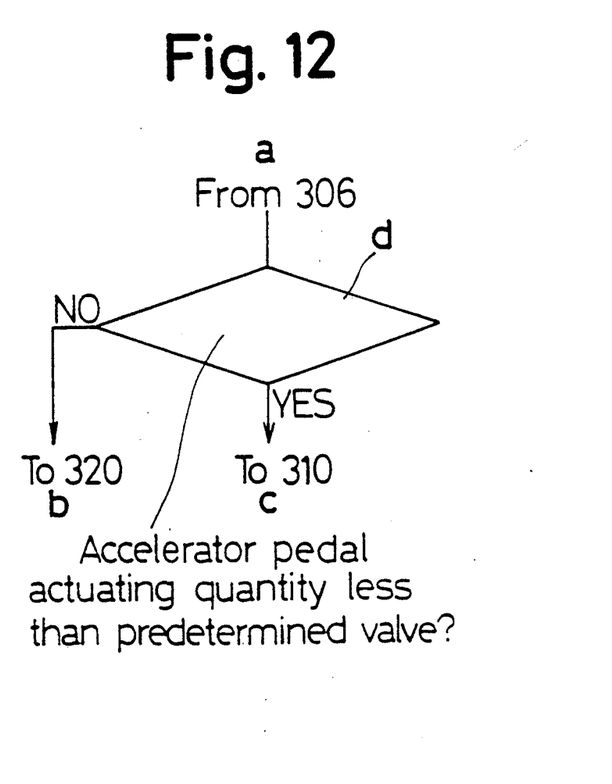
FIG. 12 is a flowchart showing a part of another example of the system check shown in FIG. 7.

It is preferable, when an override mechanism is added to the throttle control apparatus, to add a control condition that is shown in FIG. 12 between Steps 306 and 310. By doing so, the first system check is omitted during the operation of the limp home or override mechanism, thereby enabling elimination of the problem that is caused by the operation of the override mechanism. Thus, the throttle valve 11 is opened and closed during a system check operation irrespective of whether or not the driver actuates the accelerator pedal 34, and it is therefore possible to prevent the number of revolutions (RPM) of the internal combustion engine during idling or the vehicle speed from increasing against the driver's command.

Next, a first system check is made in Step 310, that is, it is checked whether or not the degree of opening of the throttle valve 11 is less than a predetermined throttle opening and the valve 11 is in an idling position. This is judged by an idling switch signal and a throttle opening signal which are outputted from the throttle sensor 13. When the system check starting conditions are judged to be satisfied in Step 306, normally the throttle valve 11 must be placed in the full-closed position by the operation of the return spring 22. Therefore, if the degree of opening of the throttle valve 11 is less than a predetermined throttle opening and the idling switching signal is not off, it is considered that some abnormality exists. In such a case, the process proceeds to Step 360, in which a sixth system check is made. When it is confirmed that the throttle valve 11 is in the idling position, the process proceeds to Step 320.

In Step 320, a second system check is made. More specifically, the electromagnetic clutch mechanism 40 is driven to bring the throttle valve 11 into a state wherein it is driven by the motor 50. Then, the motor 50 is driven in a direction in which the throttle valve 11 is opened by an amount corresponding to a predetermined number of drive pulses. The motor 50 is a stepping motor, as has been described above, and the arrangement is therefore such that the driving pulse signal and the degree of opening of the throttle valve 11 are in proportional relation to each other. Accordingly, if it is confirmed in Step 321 that the throttle valve 11 has a predetermined change in the opening in response to the driving pulse signal applied to the motor 50, the motor 50 and the throttle sensor 13 are judged to be normal, and a motor/throttle sensor abnormality flag is set to "0". The process then proceeds to Step 330. If a predetermined change in the opening of the throttle valve 11 is not available in Step 321, the system abnormality flag is set to "1" in Step 370.

In a third system check, the motor 50 is supplied with a predetermined holding current so that the throttle valve 11 is held at a predetermined opening position, and the electromagnetic clutch mechanism 40 is turned off, in Step 330. If the return spring 22 and the electromagnetic clutch mechanism 40 are normal, the throttle valve 11 returns to the idling position. If the throttle valve 11 is left held at the predetermined opening position, it is considered that the return spring 22 or the electromagnetic clutch mechanism 40 has a problem. Accordingly, it is judged in Step 331 whether or not the throttle valve 11 has returned to the initial position. If YES, the return spring 22 and the electromagnetic clutch mechanism 40 are judged to be normal and hence a return spring abnormality flag and an electromagnetic clutch mechanism abnormality flag are set to "0" in Step 332. Then, a predetermined processing (described later) is executed in Step 380.

If it is judged in Step 331 that the throttle valve 11 has not yet returned to the initial position, a fourth system check is made. More specifically, the supply of the holding current to the motor 50 is suspended with the throttle valve 11 left opened at a predetermined degree in Step 340. It is then judged in Step 341 whether or not the throttle valve 11 returns to the initial position within a predetermined time T. If YES, it is considered that the return spring 22 is normal but the electromagnetic clutch mechanism 40 has a problem. Therefore, the return spring abnormality flag is set to "0", while the electromagnetic clutch mechanism abnormality flag is set to "1", in Step 342, and the process then proceeds to Step 370, in which the system abnormality flag is set to "1".

If the throttle valve 11 does not return to the initial position within the predetermined time T in Step 341, a fifth system check is made. In this case, since the force of inertia is exerted on the motor 50 and the associated movable members for the predetermined time T, the time that is needed for the throttle valve 11 to return to the initial position is a predetermined time longer than that in the case when the electromagnetic clutch mechanism 40 is turned off, and there may also be a delay in the return time due to the fatigue of the return spring 22. For this reason, an operating condition of the return spring 22 is detected on the basis of the predetermined time T. Thus, if the throttle valve 11 does not return to the initial position within the predetermined time T, the return spring 22 is judged to be defective, and the process then proceeds to Step 350.

In Step 350, the motor 50 is driven in a direction in which the throttle valve 11 is closed by an amount corresponding to a predetermined number of drive pulses, as the fifth system check, and it is judged in Step 351 whether or not the throttle valve 11 has been closed to the predetermined opening position. If YES, it is judged that the return spring 22 is abnormal. Consequently, both the electromagnetic clutch mechanism 40 and the return spring 22 are judged to be defective, and both the return spring abnormality flag and the electromagnetic clutch mechanism abnormality flag are set to "1" in Step 352. Then, the system abnormality flag is set to "1" in Step 370.

If the throttle valve 11 is not closed to the predetermined opening position in Step 351, the failure is considered attributable to a problem arising after the throttle valve 11 has been opened, and the sixth system check is then made. More specifically, the electromagnetic clutch mechanism 40 is turned on and the motor 50 is driven in a direction in which the throttle valve 11 is closed by an amount corresponding to a predetermined number of pulses in Step 360. Then, irrespective of whether or not the throttle valve 11 has returned to the closed position, it is judged in Step 361 whether or not the present system check is being made as the first cycle or the second cycle. If the first cycle is the answer, a flag which indicates that the number of times of execution of the system check is set to "1", and the procedures are then repeated from Step 302. If it is judged in Step 361 that the present system check is being made as the second cycle, it means that the throttle valve 11 did not return to the closed position, although the same procedures were executed twice, and it is therefore considered that there is an abnormality. Accordingly, the process proceeds to Step 370, in which the system abnormality flag is set to "1".

When the system abnormality flag is set to "1" in Step 370, the main relay 109, the electromagnetic clutch mechanism 40 and the motor 50 are all turned off in Step 380.

To turn off the electromagnetic clutch mechanism 40 and the motor 50 is to disconnect the respective drive circuits of the electromagnetic clutch mechanism 40 and the motor 50, and independently of this, the respective power circuits of the electromagnetic clutch mechanism 40 and the motor 50 are disconnected by turning off the main relay 109. Thus, the electromagnetic clutch mechanism 40 and the motor 50 are deactivated. Instead, only the respective driving circuits of the electromagnetic clutch mechanism 40 and the motor 50 may be turned off, with the main relay 109 left in the onstate. Conversely, the main relay 109 alone may be turned off.

The starter control relay 203 is not turned on until the process proceeds to Step 380. More specifically, the starter motor 201 that is shown in FIG. 5 is left inoperative and hence the internal combustion engine is disable from being started until the result of each system check is obtained. It should be noted that, after the electromagnetic clutch mechanism 40 and the motor 50 have been deactivated, if the accelerator pedal 34, shown in FIG. 3, is stepped on or depressed in excess of a predetermined accelerator pedal actuating quantity, the accelerator plate 36 joins or is connected to the pin 23 that is provided on the throttle plate 21 and these members rotate together as one unit. Thus, it is possible to ensure a predetermined throttle opening by the override operation and hence drive the vehicle to a repair shop.

The reason why the starter control relay 203 is turned off at the beginning of a system check in the foregoing embodiment is to avoid an undesired rise in the engine speed or an undesired increase in the vehicle speed due to an increase in the number of revolutions (RPM) of the internal combustion engine during a system check operation, as described above. It is therefore also possible to provide in place of the starter control relay 203 a fuel cut means, i.e., a means which suspends the supply of fuel, or a means which suspends the generation of the ignition signal by cutting off the power supply to the ignition circuit. Alternatively, the driver may be informed by means of an indicator or sound not to turn the ignition key (not shown) to the start position.

Figure 10:
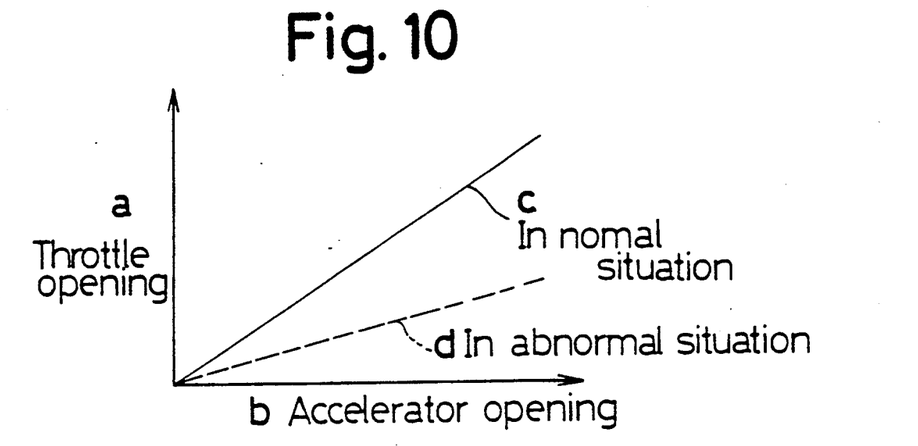
FIG. 10 is a characteristic chart showing the relationship between the accelerator opening and the throttle opening in another embodiment of the present invention.

Although in the foregoing embodiment the main relay 109, the electromagnetic clutch mechanism 40 and the motor 50 are all turned off in Step 380 shown in FIG. 9 when the system abnormality flag is set to "1", the control process may also be executed in the manner described below when it is judged by the fourth and fifth system checks that the return spring 22 is defective and the electromagnetic clutch mechanism 40 has a failure to disengage the throttle valve 11 and the motor 50. That is, constant-speed running control and acceleration slip control are inhibited, and during a normal accelerator control the gain for the target throttle opening is held down as shown by the chain line in FIG. 10. By doing so, it is possible to ensure a given performance of the system as a whole.

Figure 11:
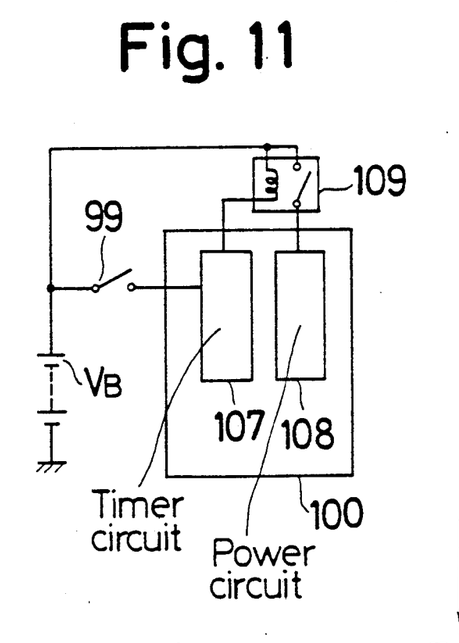
FIG. 11 is an electric circuit diagram concerning still another embodiment of the present invention.

Although in the foregoing embodiment a system check is made when the ignition switch 99 is turned on, the arrangement may also be such that the electrical connection between the controller 100 and the power supply VB is maintained for a predetermined period of time even after the ignition switch 99 has been turned off, thereby conducting the above-described system check operation after the ignition switch 99 has been turned off. For example, as shown in FIG. 11, a timer circuit 107 may be interposed between the main relay 109 and the ignition switch 99 so that the power circuit 108 of the controller 100 is connected to the power supply VB for a predetermined period of time, which is set in the timer circuit 107, after the ignition switch 99 has been turned off.

Thus, the present invention provides the following advantages.

According to the throttle control method of the present invention, during normal running the throttle opening is controlled by the operation of the motor and it is therefore possible to ensure smooth start and running and it is also possible to readily effect various control operations such as constant-speed running control. In addition, an operating condition of each constituent element of the throttle control apparatus, for example, the motor, is detected, and when an abnormality is detected in any constituent element, both the motor and the clutch mechanism are deactivated. It is therefore possible to surely inspect the function of each device and it is also possible to prevent the throttle valve from being opened during inspection regardless of the driver's will.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A throttle control method for an internal combustion engine wherein a motor is connected through a clutch mechanism to a throttle valve which is constantly biased toward a closed position by a return spring, said motor being controlled in accordance with an output signal from a throttle sensor which detects a predetermined opening of said throttle valve, thereby controlling intake air into said internal combustion engine, and wherein said clutch mechanism is engaged and disengaged in accordance with a running condition of the vehicle and an operating condition of said internal combustion engine, said method comprising detecting an operating condition of said motor, said throttle sensor, said clutch mechanism and said return spring by activating said motor and said clutch mechanism, and deactivating both said motor and said clutch mechanism when an abnormality is detected in at least one of said motor, said throttle sensor, said clutch mechanism and said return spring, inhibiting starting and maintaining said internal combustion engine in an inoperative state when said motor and said clutch mechanism are activated in order to detect an operating condition of said motor, said throttle sensor, said clutch mechanism and said return spring.

2. A throttle control method for an internal combustion engine wherein a motor is connected through a clutch mechanism to a throttle valve which is constantly biased toward a closed position by a return spring, said motor being controlled in accordance with an output signal from a throttle sensor which detects a predetermined degree of opening of said throttle valve, thereby controlling intake air into said internal combustion engine, and wherein said clutch mechanism is engaged and disengaged in accordance with a running condition of the vehicle and an operating condition of said internal combustion engine, said method comprising detecting an operating condition of said motor, said throttle sensor, said clutch mechanism and said return spring by activating said motor and said clutch mechanism, deactivating said motor and said clutch mechanism when an abnormality is detected in either said motor or said throttle sensor, and controlling the throttle opening to a level less then normal throttle control when said motor and said throttle sensor are operating normally and one of said clutch mechanism and said return spring is operating abnormally, inhibiting starting and maintaining said internal combustion engine in an inoperative state when said motor and said clutch mechanism are activated in order to detect an operating condition of said motor, said throttle sensor, said clutch mechanism and said return spring.

* * * * *